United States Patent [19]

Hedenberg

[11] Patent Number: 4,550,653
[45] Date of Patent: Nov. 5, 1985

[54] APPARATUS FOR MAKING FOOD PRODUCTS

[75] Inventor: Gunnar Hedenberg, Grundsund, Sweden

[73] Assignee: Heden-Team A.G., Triesenberg, Liechtenstein

[21] Appl. No.: 481,154

[22] Filed: Apr. 1, 1983

[30] Foreign Application Priority Data

Dec. 28, 1982 [SE] Sweden .............................. 8207438

[51] Int. Cl.⁴ ............................................ A47J 27/62
[52] U.S. Cl. ........................................ 99/348; 99/353; 426/233; 426/392
[58] Field of Search ................. 99/348, 353, 355, 357, 99/485, 483; 366/69, 146, 349, 348; 426/233, 392

[56] References Cited

U.S. PATENT DOCUMENTS

| 2,800,269 | 7/1957 | Smith . |
| 3,194,185 | 7/1965 | Spinosa . |
| 3,282,412 | 11/1966 | Carella et al. . |
| 3,588,054 | 6/1971 | Ljungberg et al. . |
| 3,771,773 | 11/1973 | Schriever .............................. 366/69 |
| 3,882,768 | 5/1975 | Troisi et al. . |
| 4,189,992 | 2/1980 | Barry . |
| 4,202,257 | 5/1980 | Masuda ................................. 99/348 |
| 4,241,648 | 12/1980 | Longenecker . |
| 4,294,166 | 10/1981 | Takeuchi ............................... 99/348 |

Primary Examiner—Robert W. Jenkins
Attorney, Agent, or Firm—Holman & Stern

[57] ABSTRACT

An apparatus for automatically making food products in piece form wherein dry ingredients are provided in a flexible sealable bag and placed in a dough preparation station of the apparatus. The necessary amount of liquid to form a dough-like substance is introduced into the ingredients and the dough is then kneaded to form a properly mixed dough. In cases where fermentation is required, e.g. when baking bread, the fermentation takes place in the bag. The so-formed dough is then transferred to a heat treating station where it is baked. The mixing of the liquid with the dough ingredients to form the dough; kneading the dough; fermenting the dough and baking the dough is done in an automated programmed sequence so that the baked food product will be in the fresh prepared state at the desired time.

17 Claims, 22 Drawing Figures

FIG 5
FIG 6
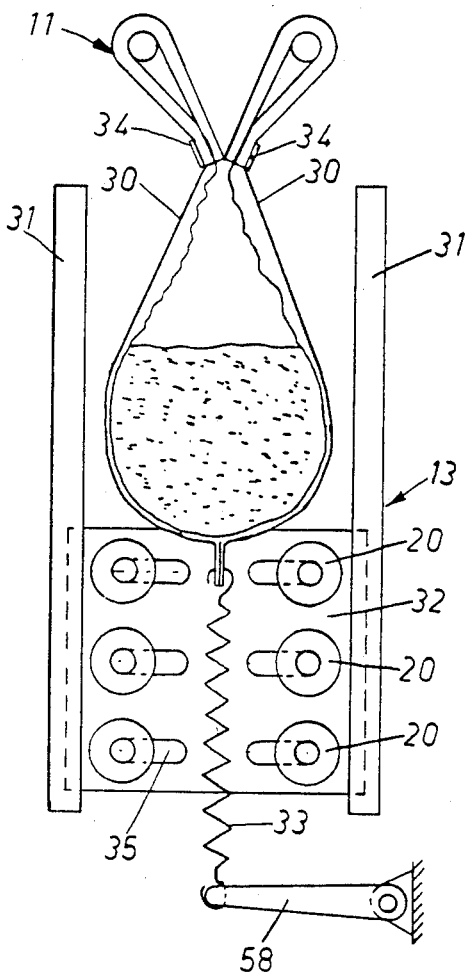
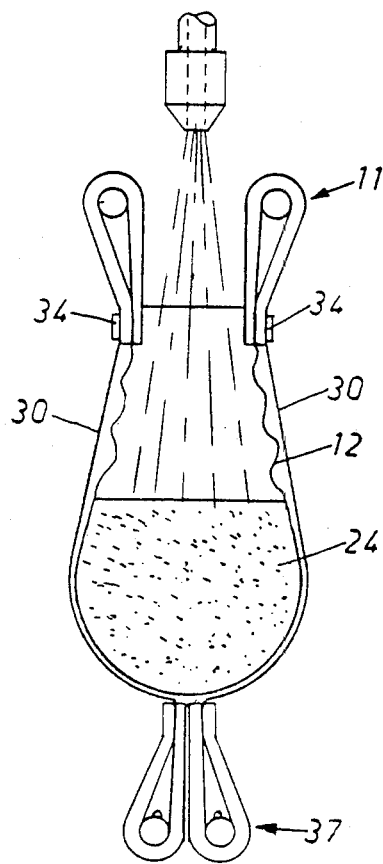
FIG 11
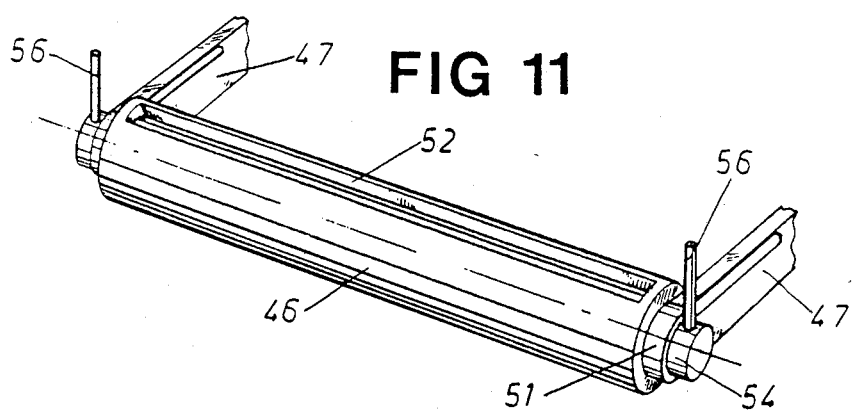

APPARATUS FOR MAKING FOOD PRODUCTS

The present invention concerns the apparatus for performing a method of automatically making food products from doughlike substances in piece form such as break, cakes, pies, paste and the like, starting from dry or semi-dry substance ingredients.

BACKGROUND OF THE INVENTION

Preparation of food products from doughlike substances requires kneading to form a properly mixed dough. This is a relatively complicated, time consuming, work intensive and messy business.

SUMMARY AND ADVANTAGES OF THE INVENTION

One object of the invention is to achieve an apparatus for facilitating preparation and kneading of doughlike substances starting from dry or semi-dry substances for making food products such as bread, cakes, pies, paste and the like. Another object is to achieve an automated apparatus with which it is possible to make such food products, for example bread, without any real work involved, without soiling various vessels and work instruments, and which apparatus can be programmed so that a correctly performed fermentation process under the correct conditions is achieved so that a qualitatively excellent product is obtained.

This is achieved by the fact that the dough preparation, that is mixing the dry ingredients with liquid to form the dough, dough kneading and possibly one or more fermentations takes place in at least one and the same flexible, closed vessel, for example, a plastic bag. The kneading is by mechanical work on the vessel, and the heat treating of the thus prepared dough is by baking, boiling or frying.

BRIEF DESCRIPTION OF THE DRAWINGS

FIG. 5 shows a section through an alternative embodiment of a schematically illustrated dough preparation station of an apparatus.

FIG. 6 shows a section through a somewhat modified embodiment of the dough preparation station shown in FIG. 5.

FIG. 11 shows the roller according to FIG. 10 in perspective.

DESCRIPTION OF PREFERRED EMBODIMENTS

FIGS. 1-4

Figure 1:
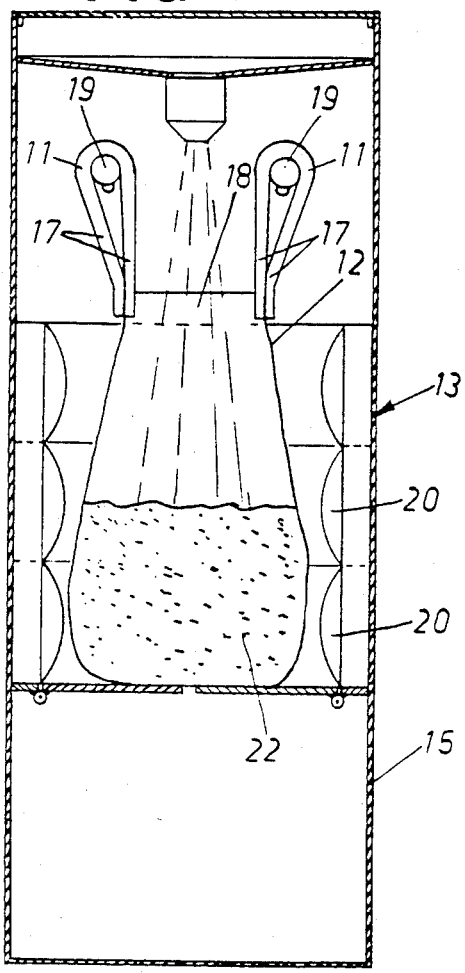
FIG. 1 shows schematically a section through that station in an apparatus according to the invention which is for the dough preparation, during addition of the liquid to form the dough in a vessel.

The apparatus according to the embodiment shown in FIGS. 1-4 consists of holding means 11, a flexible vessel 12 attachable to it, a dough preparation station 13 and possibly a heat treating station 14. The whole arrangement is located inside a shell 15, the heat treating station is thermally insulated.

Figure 22:
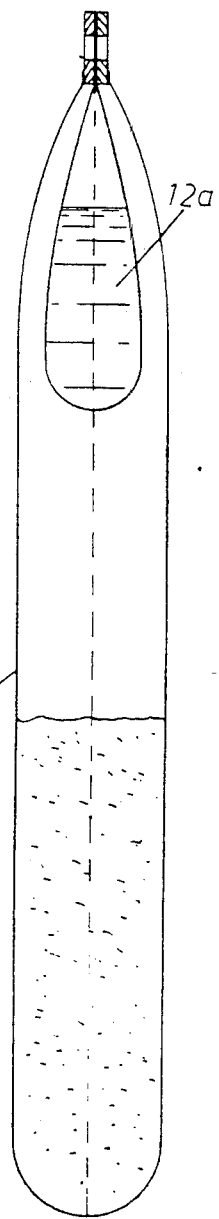
FIG. 22 shows a section through a flexible vessel in which is contained an inner flexible vessel containing liquid for the dough.

The flexible vessel, which can be a plastic bag for example, can be used as a transportation package for the dry ingredients from the producer to the user. The plastic bag 12 must be able to withstand rough mechanical treatment and possibly also contains a second plastic bag 12a or the like, as is shown in FIG. 22 and in which is contained the liquid required for preparation of the dough. Alternatively, the liquid for the dough can also be added through a nozzle 16, especially if the liquid is only water. In the latter case the plastic bag 12 is attached to at least two holding means 11 which are so formed that the end pieces of the opening 18 of the plastic bag can be squeezed between two gripping means 17. After attaching the plastic bag 12 to the holding means 11 the baking apparatus is started by, for example, inserting a punched card into the apparatus programmer, which then takes care of the whole production process. The punched card could be supplied with the dry ingredients package or alternatively be part of a program library belonging to the baking apparatus.

Figure 2:
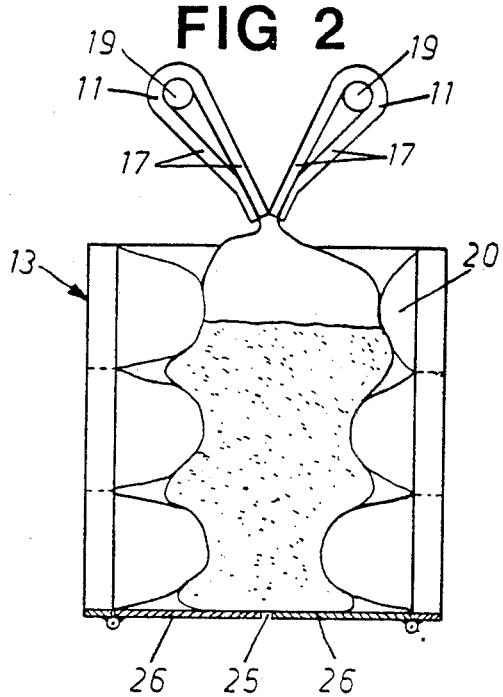
FIG. 2 shows the dough preparation station according to FIG. 1 during the dough kneading of the vessel.
Figure 3:
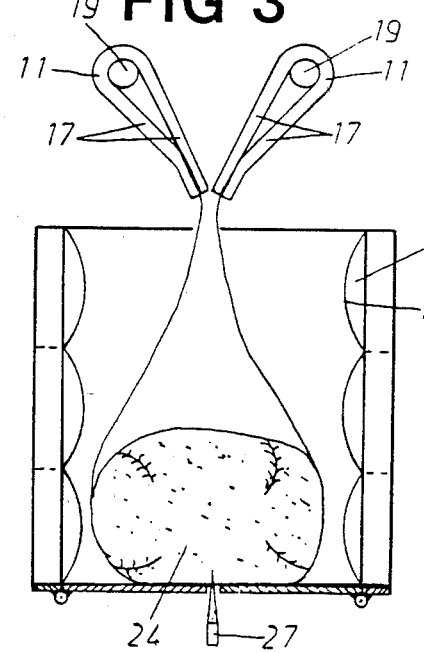
FIG. 3 shows the dough preparation station, according to FIGS. 1 and 2 during the final phase of fermentation including means for opening the vessel.
Figure 4:
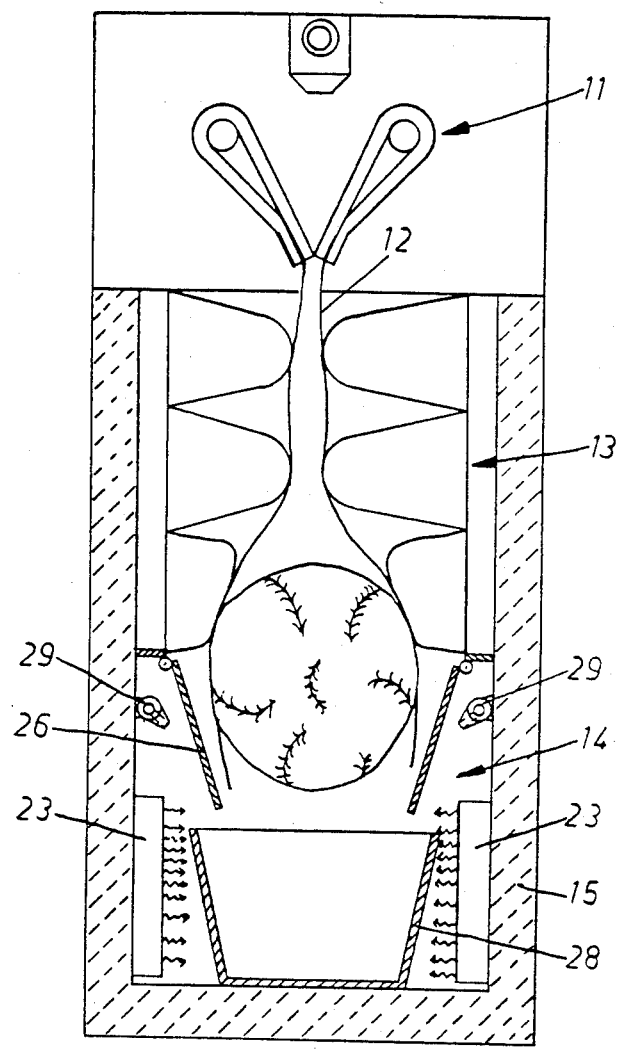
FIG. 4 shows a section through the apparatus during extraction of the dough from the dough preparation station to the heat treatment station.

The holding means 11 are rotatable about and secured to their own axles 19 so that the bag can either be held open, as shown in FIG. 1, or also be closed as shown in FIGS. 2-4.

In the alternative where the plastic bag contains an inner bag containing liquid for the dough, as is shown in FIG. 22, it is sufficient that the dough preparation station has only one holding means 11 because the whole dough preparation procedure can take place in the unopened outer plastic bag.

The dough preparation station 13 is placed directly under the holding means 11 and can be made in a number of different embodiments. In the embodiment shown in FIGS. 1-4 the dough preparation station consists of a hydraulic or pneumatic apparatus spaced from the plastic bag 12 and equipped with a number of kneading means 20 around the bag. Each kneading means of a flexible wall 21 which by increasing the pressure of the working medium, hydraulic oil or air pressure, can expand and upon reducing the pressure return to its original withdrawn position. Through individual regulation of the different kneading means 20 a systematic and effectiv mixing together of the ingredients and a soft kneading of the dough is achieved.

If the liquid for the dough is in an inner plastic bag the kneading means 20 directly opposite the inner plastic bag can be activated before the other kneading means are started, so that the inner plastic is burst, possibly along a breaking line, and the liquid in the dough is added to the dry ingredients 22.

The programmer interrupts the dough preparation after an pre-determine dough preparation time so that no overworking of the dough occurs which could lead to dry bread. After the preparation of the dough the heater 23 in the heat treating station 14 can be started in order to obtain a temperature such that the fermentation can be carried out in the best way. The dough 24 can be made to ferment several times interrupted by new kneading operations according to the inserted program. When the dough is finished fermenting a cutting device 27 is inserted through a slit 25 between the bottom doors 26 of the dough preparation station 13, which cuts open the bottom of the plastic bag, as is shown in FIG. 3.

By opening the bottom doors 26 the dough ball 24 can fall down onto the baking pan or baking form 28 in the heat treating station and baking the bread can begin after the bottom doors have been closed again so that the heat treating station is shielded from the dough prepration station. The extraction of the dough ball 24 from the dough preparation station can be assisted by the kneading means 20.

Baking can take place directly under the dough preparation section 13 if the heat can be shielded from the dough preparation station sufficiently well, but it is also possible that the baking pan or baking form 28 is transported from the dough preparation section to the heat treating section at a different location. There can be spray nozzles 29 in the heat treating section for spraying the dough or the completed baked product with water or some other appropriate liquid in order to obtain a crust and/or a shiny surface around the bread. Depending on what kind of product is being produced, cooling of the product can either take place by gradually cooling in the heat treating section or the section can be force ventillated so that a fast cooling takes place.

FIGS. 5 & 6

Because the flexible vessel 12, preferably a plastic bag, must be made of a thick plastic which can withstand the kneading of its contents, it will be relatively expensive. According to an alternative embodiment shown in FIG. 5, an outer flexible container 30 is attachable to the holding means 11, inside which the flexible vessel 12 can be placed, which contains the ingredients which are needed for making the desired food product. The flexible vessel, that is the plastic bag, can in this embodiment consist of a very thin plastic foil since the real mechanical work is done on the outer flexible container 30. If this embodiment is used in the hydraulic or pneumatic dough preparation section 13, which is shown in FIGS. 1-4, the flexible container 30 does not need to be fixed at its lower part. If on the other hand the dough preparation section 13 consists of a subassembly 32 movable along guides 31 and equipped with a number of kneading means 20 in the form of rotatable rollers, the flexible container 30 must be fixed at its lower part, for example with a spring 33. It is appropriately firmly attached to a rotatable arm 58, which can be rotated to take up tension. The flexible container 30 is opened by tempoirally loosening one locking piece 34 of the holding piece 11 for holding one end edge of the container 30.

The kneading means 20 in the form of rollers are selectively adjustable with appropriate drives (not shown) toward and away from each other along horizontal slits 35, so that during the motion of the subassembly 32 up and down along the guides 31 an effective kneading of the flexible vessel within the container 30 is obtained.

In the embodiment according to FIG. 6 a flexible outer container 30 is arranged in the same way as for the embodiment according to FIG. 5, which is fixed at its upper part to the locking pieces 34 of the holding means 11 and at its lower part it is fixed to a second holding piece 37 which in the same way as the upper one is arranged to open the lower part of the container so that after opening the flexible vessel 12 at the bottom the dough can be pressed out.

It is possible to equip the bottom part of the flexible vessel 12 with a breaking line which with the help of the kneading means can be broken when the holding piece 37 has been opened and the dough is to be transferred to the baking form 28.

FIGS. 7-11

Depending on the consistency of the dough and on working requirements it is also possible to adjust the baking apparatus to these requirements. The above described exemplifications are first of all designed for production of relatively hard doughs which are difficult to work with and which need a strong thorough kneading. In the case of lighter doughs, which can contain larger quantities of liquid, the dough preparation section can be designed more simply, as shown in FIGS. 7-11. In this embodiment the dough is worked in the flexible vessel 12, that is, the plastic bag, along a path which has in principle the same function as a rolling board. The path or rolling board 38 is curved and forms a part of a circular arc in the center of which is arranged a rotation axle 39 which transfers its rotation motion to two arms 40. The rolling board 38 is firmly attached in a housing 41 which contains a dough preparation section 13 with drive 42 for the arms 40 and a heat treating section 14 with a drive mechanism 43 for linear motion of the section, which is a baking oven, from a withdrawn position to an extended position. The housing is further equipped with a top 44 rotatable around a hinge 45. Around it is also rotatably arranged a holding means 22 for support of the upper opening of the flexible vessel 12, e.g., a plastic bag.

The dough preparation section 13 consists of the arms 40 placed on each side of the cylindrical rolling board 38. To the upper end of the arms 40 are attached kneading means 20 consisting of a roller 46 arranged at the free ends of a fork 47 which is rotatbly attached to a pressing roll 48 which is mounted in a bearing at the free ends of the arms 40.

The upper end of the rolling board 38 is formed ith a somewhat larger radius than the rest of the rolling board so that a harder pressure by the pressing roll 48 against the rolling board 38 is obtained in that area. The arms are in the form of telescoping arms in which is arranged a stretched spring which exerts a predetermined pressure on the pressing roller 48 against the rolling board 38.

Figure 10:
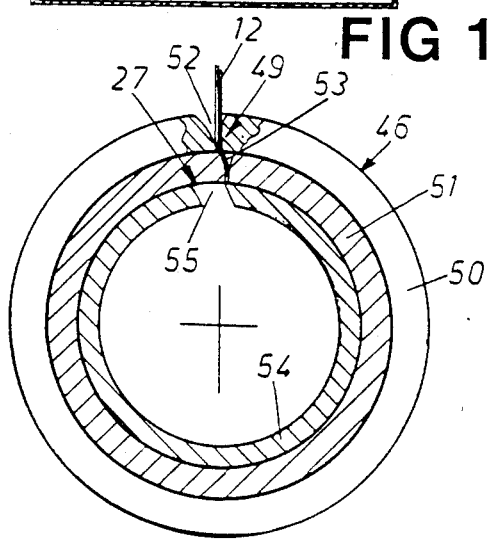
FIG. 10 shows in a larger scale a section through a roller which is part of the apparatus according to FIGS. 7-9.

The roller 46 is appropriately made with fixation pieces 49 through which the lower end of the flexible vessel 12, i.e., a plastic bag, can be affixed to the roller. In the embodiment of FIGS. 10 and 11 the roller 46 consists of an outer shell, for example, of a somewhat elastic material, such as synthetic rubber, and an inner cylinder, which is mounted on a bearing in the free ends of the forks 47. Both the outer shell 50 and the inner cylinder 51 are equipped with its own slit 52, 53 in which the lower end of the plastic bag can be inserted and fixed by moving the outer shell 50 relative to the inner cylinder 51. The lower end part of the plastic bag inserted in the slit and held closed by the fixation pieces 49, but it is also possible to equip the roller 46 with a cutting device 27 in the form of a slitted bushing 54 inside the inner cylinder, the slit being placed opposite the slits 53 and 52 so that the extreme end of the plastic bag can be inserted in the slit 55. The bushing 54 is longer than the inner cylinder 51 and pins 56 are attached to the parts outside the cylinder 51 (see FIG. 11) which in a certain position of the roller 46 cooperates with fixed abutments (not shown) so that the bushing is turned in relation to the cylinder whereby the end of the plastic bag inserted in the slit 55 is cut off.

The flexible vessel 12, i.e., a plastic bag can either have an inner bag containing liquid to form the dough which through the action of the dough preparation section is opened so that its contents is emptied into the plastic bag, or it is also possible to add the liquid to form the dough, as will be described below.

Figure 7:
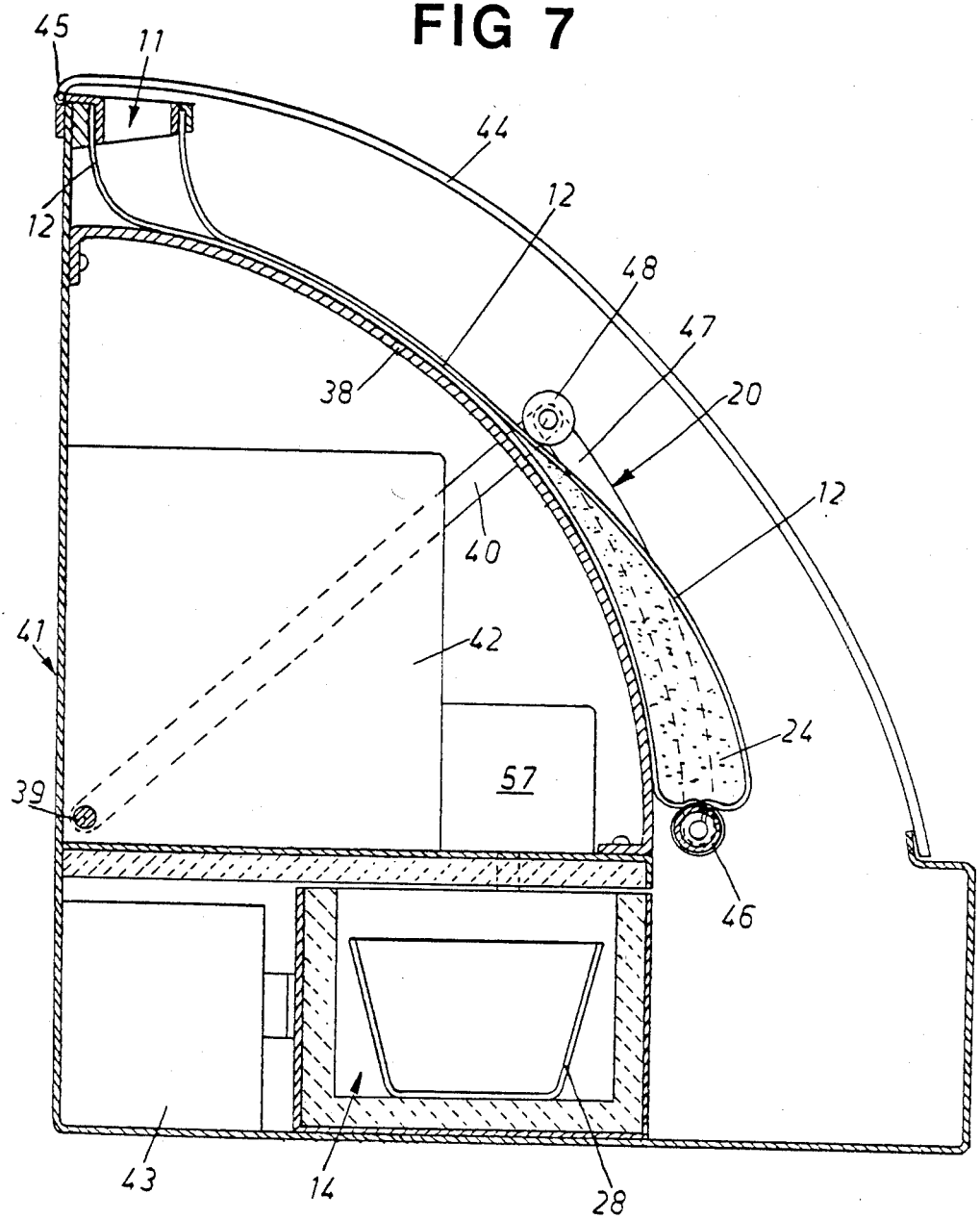
FIGS. 7, 8 and 9 show sections through another embodiment of the apparatus according to the invention during different phases of the dough preparation.

In accordance with what is shown in FIG. 7, the upper end of the plastic bag is fixed in the holding means 11 of the baking apparatus which holds the bag open so that an opening is formed. In that position the kneading means 20 of the dough preparation station are placed in the position shown in FIG. 7 in which the plastic bag can be drawn under the pressing roller 48 while the lower end of the plastic bag can simultaneously be fixed to the roller 46.

Figure 8:
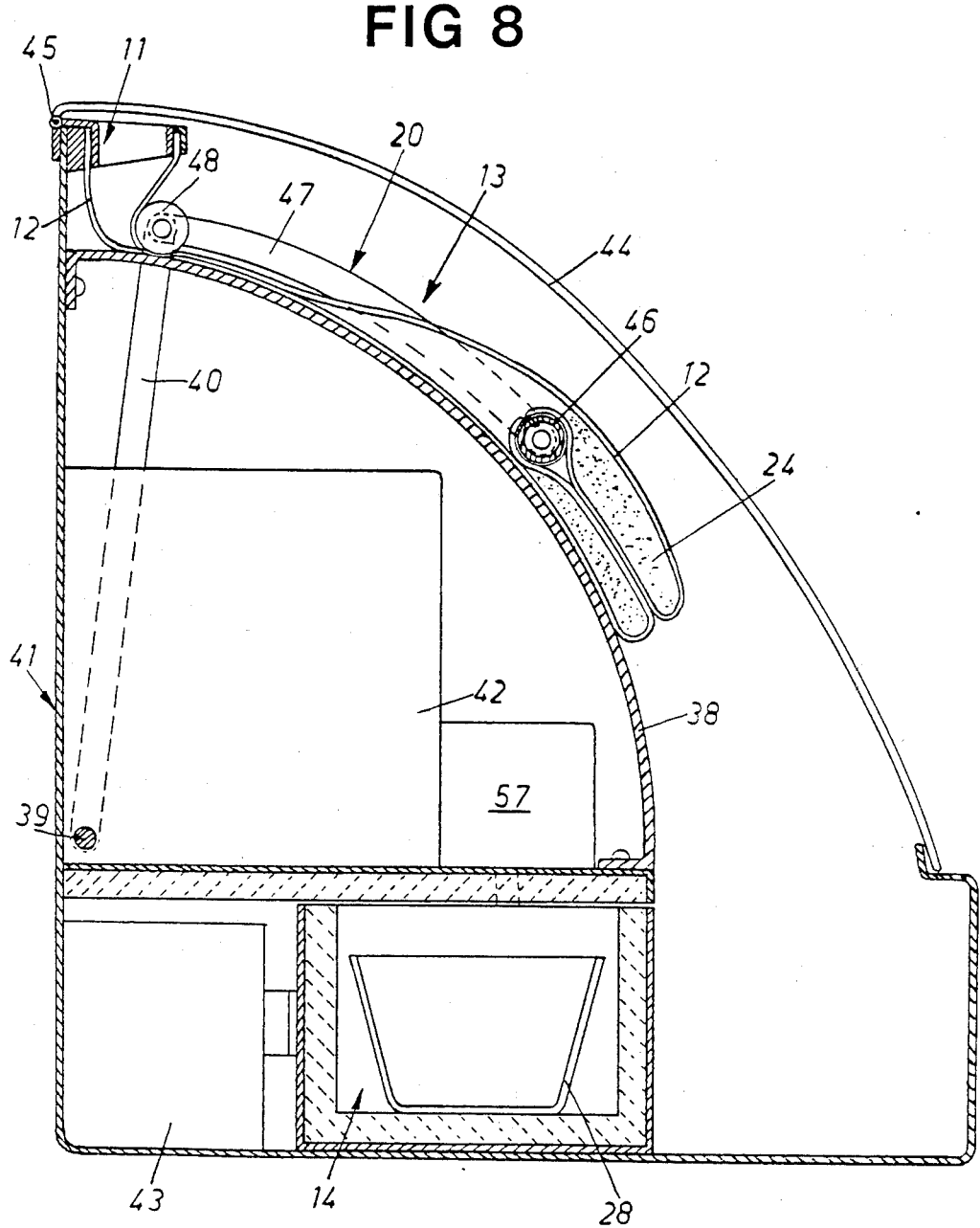
Figure 9:
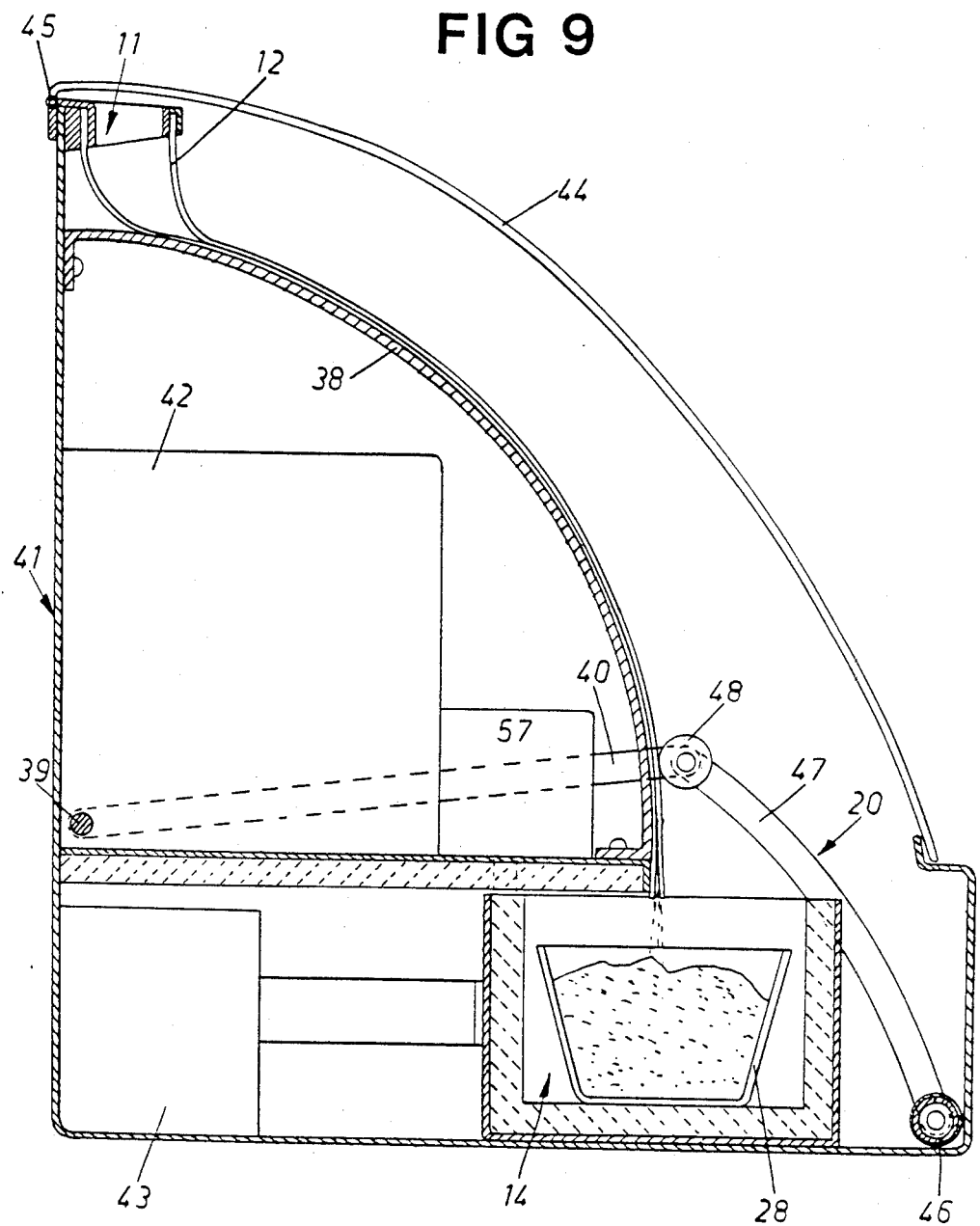

When the bag is in place the arms 40 are moved to their upper position, as is shown in FIG. 8, in which position the roller 48 exerts a pressure so great against the bag and rolling board 38 that an effective sealing is realized. Then the liquid for the dough can be poured into the funnelshaped upper part of the plastic bag and the timer in the baking apparatus programmer is set to the desired initiation time.

At an appropriate time the arms 40 are activated, which performs an up and down motion around the axle 39 a predetermined number of times until the dry substances have been mixed with the liquid to form the dough and a doughy mass is obtained. When the arms approach the position seen in FIG. 7 the pressing roll 48 is spaced slightly from the rolling board 38 and the liquid is allowed to admix with the dry ingredients to form the dough 24. Depending on the baking recipe the kneading is repeated an appropriate number of times interrupted by fermentation periods. When the dough is completely worked and fermented the programmer starts the drive mechanism 43 which moves the heat treating station (oven) 14 to the position shown in FIG. 9 so that the baking pan 28 is positioned under the lower end of the plastic bag.

In order to open the plastic bag the arms 40 execute a much larger arcuate motion in comparison to the kneading motion, whereby the lower part of the plastic bag is cut off and freed from the roller 46 while the pressing roll 48 presses the dough mass out of the lower opening of the plastic bag and into the baking form or pan 28 during its downwards motion. The heat treating station 14 is then drawn back to its original position where the actual baking takes place by letting the heater 57 expose the dough to the heat treatment for an appropriate amount of time.

FIGS. 12-18

In the embodiment seen in FIGS. 12-18 the curved path or rolling board 38 is the outer surface of a cylinder mounted on a bearing in the baking oven housing 41. In the same way as in the previous embodiments it is equipped with kneading means 20 rotatable from the center of a drum 58, which kneading means is equipped with fixation pieces 49 at its free end for holding the lower end of the plastic bag 12. The upper end of the bag is fixed to a funnel-like holding means 11 whereby the attachment can be performed by drawing the folded edges of the plastic bag around the opening over a frame 59 fastened to the holding means 11.

A pressing roll 48 is also rotatably affixed at the axis of the drum 58 and is spring biased and supported by two arms 40 whereby the springs draw the pressing roll 48 radially inwardly toward the rolling board surface 38 of the drum 58. The pressing roll 48 is further guided by an arcuate guide 60 which is curved along the curve of the drum and which is rotatable around a hinge 61 by a drive mechanism 62. The arcuate flap or guide 60 can also be formed by the front top of the baking apparatus. It is possible that a rod system 63 can come from the drive mechanism 62 which together with maneuvering the guide 60 moves the baking pan 28 from a position outside the heat treating station to a position within.

Figure 12:
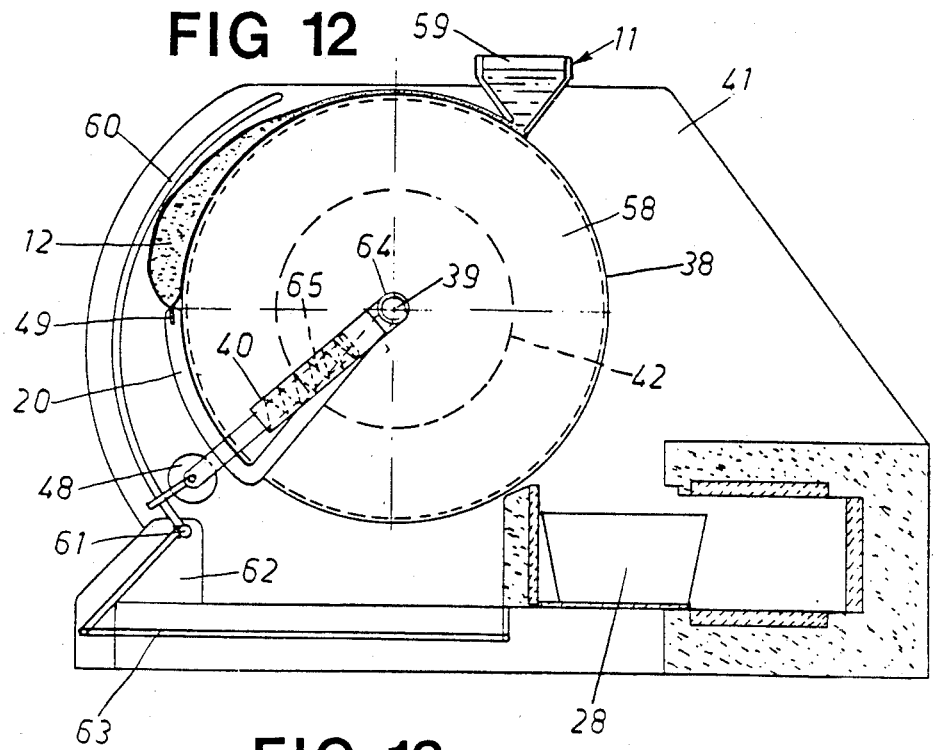
FIGS. 12-18 show a further embodiment of a modified apparatus according to FIGS. 7-11, in side view and partly in section.
Figure 13:
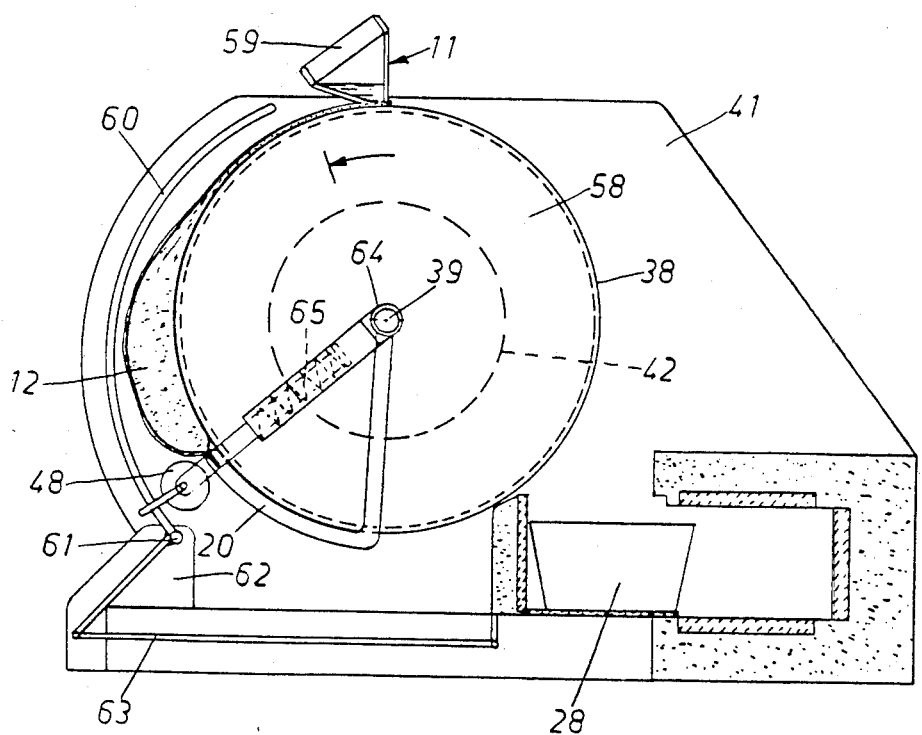

FIG. 12 shows the baking apparatus in a starting position in which the holding means 11 are placed on one side, the right side of the highest point of the drum 58. In that position the portion of the plastic bag with the dry ingredients is on the left side of the highest point of drum 58 and the upper part of the plastic bag forms a cone-like opening. Into the cone-like opening is poured the required amount of liquid to form dough and then the baking apparatus timer is turned to the desired start time. In a programmer, not shown, a program card is inserted or a desired program is started. After the alloted time the drum 58 is turned slowly counter clockwise until the cone-shaped opening is located at the highest point of the drum 58 and the liquid can flow over to that part of the plastic bag where the dry ingredients are placed, according to FIG. 13. During rotation of the drum in counter clockwise direction the kneading means 20 which is fixed to the lower end of the bag will move as seen in FIG. 13. When essentially all of the liquid has been emptied into the plastic bag the kneading means 20 is activated and carries out a to and fro motion around the central drive axle 39 of the drum by means of a drive mechanism 42 placed in the drum.

Figure 14:
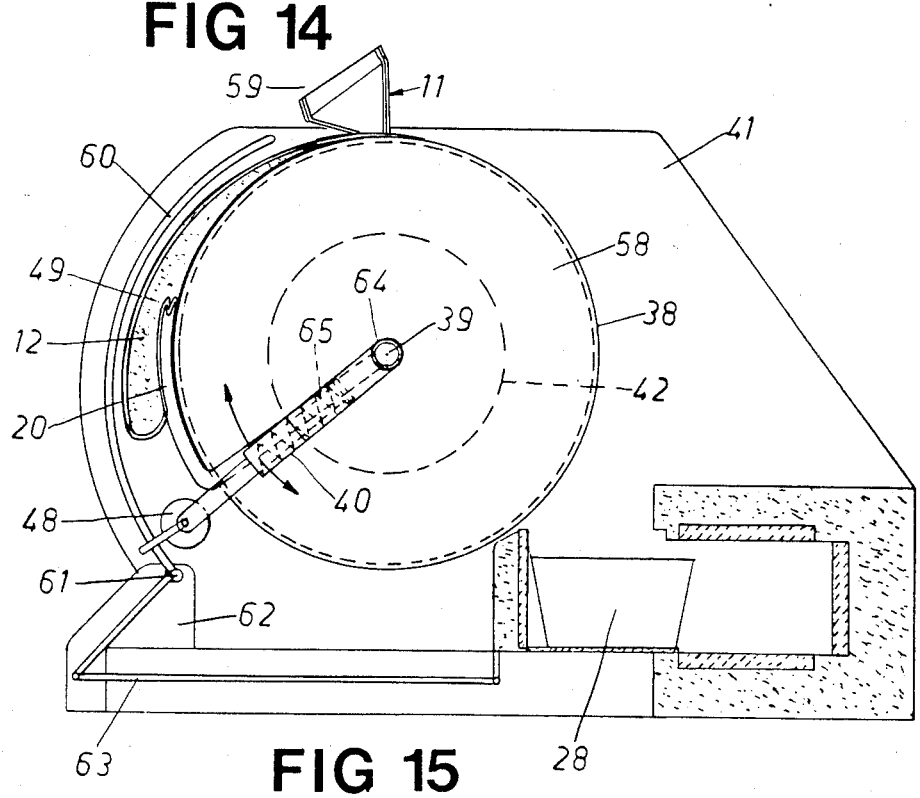

It is possible that the kneading can be helped by the pressing roll 48 which independently of the kneading means 20 is rotatable around a pipe axle 64 concentric with the rotation axle 39. With the help of the guide 60 the pressure roller 48 can be held at an appropriate distance from the rolling board surface 38 of the drum 58 by means of a spring 65 so that an appropriate redistribution of the dough mass in the plastic bag 12 is achieved. Working the dough through the kneading piece 20 is shown in FIG. 14.

Figure 15:
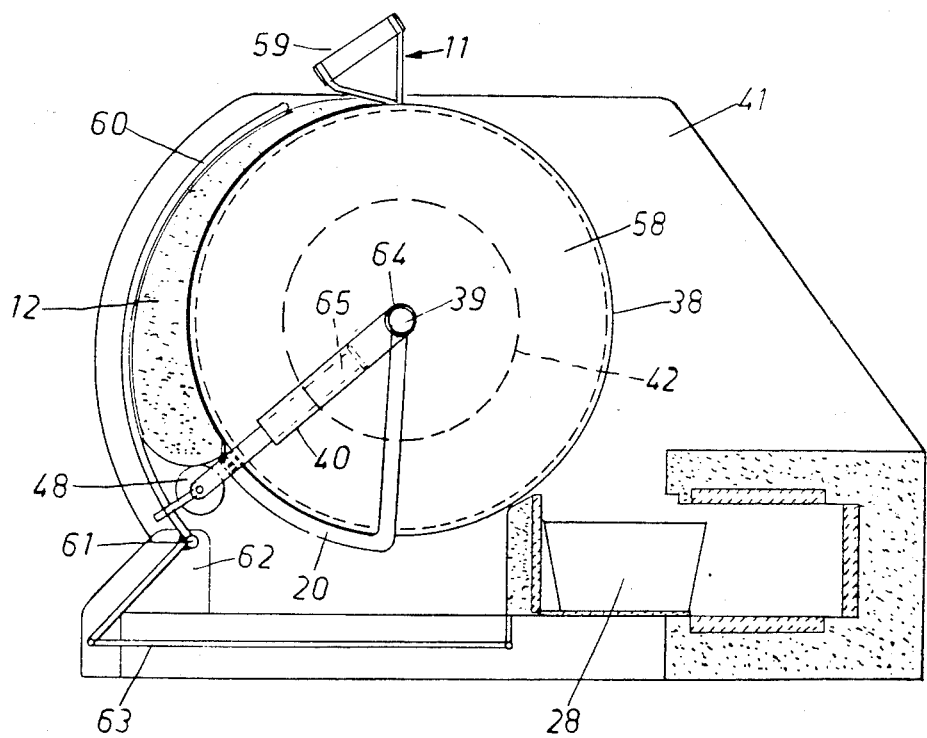
Figure 16:
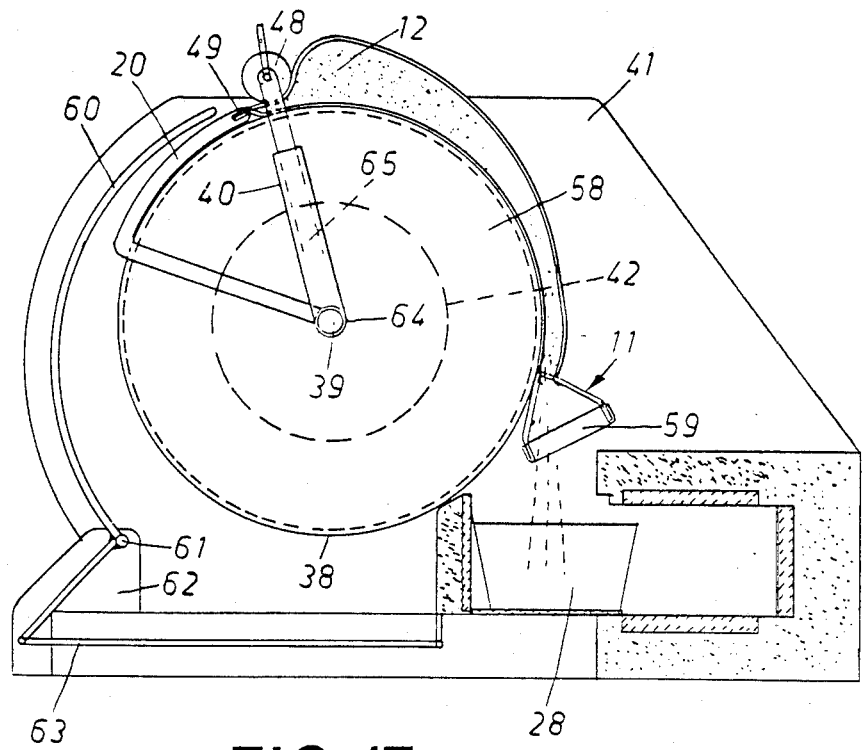
Figure 17:
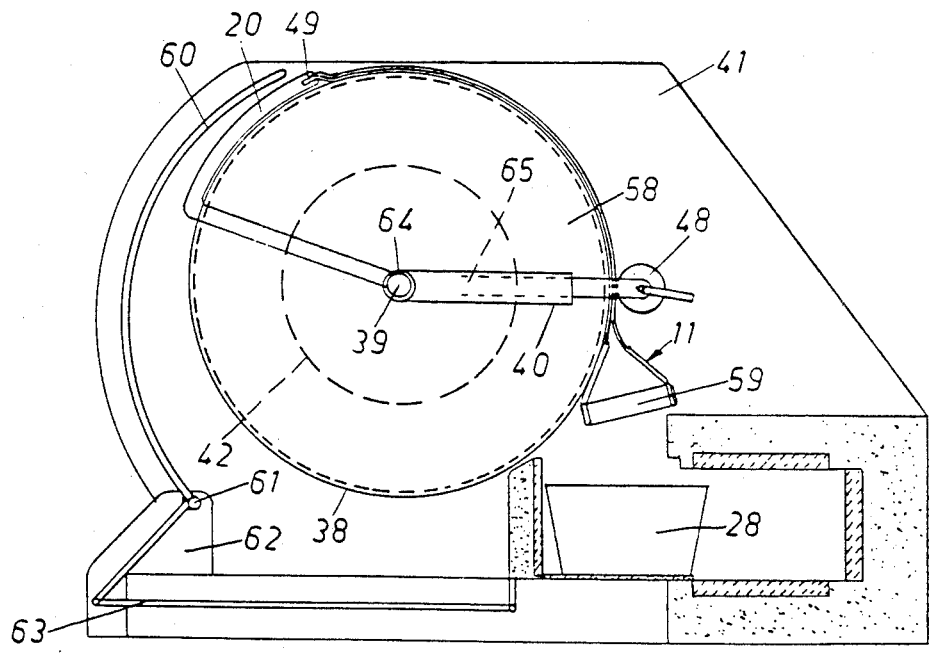
Figure 18:
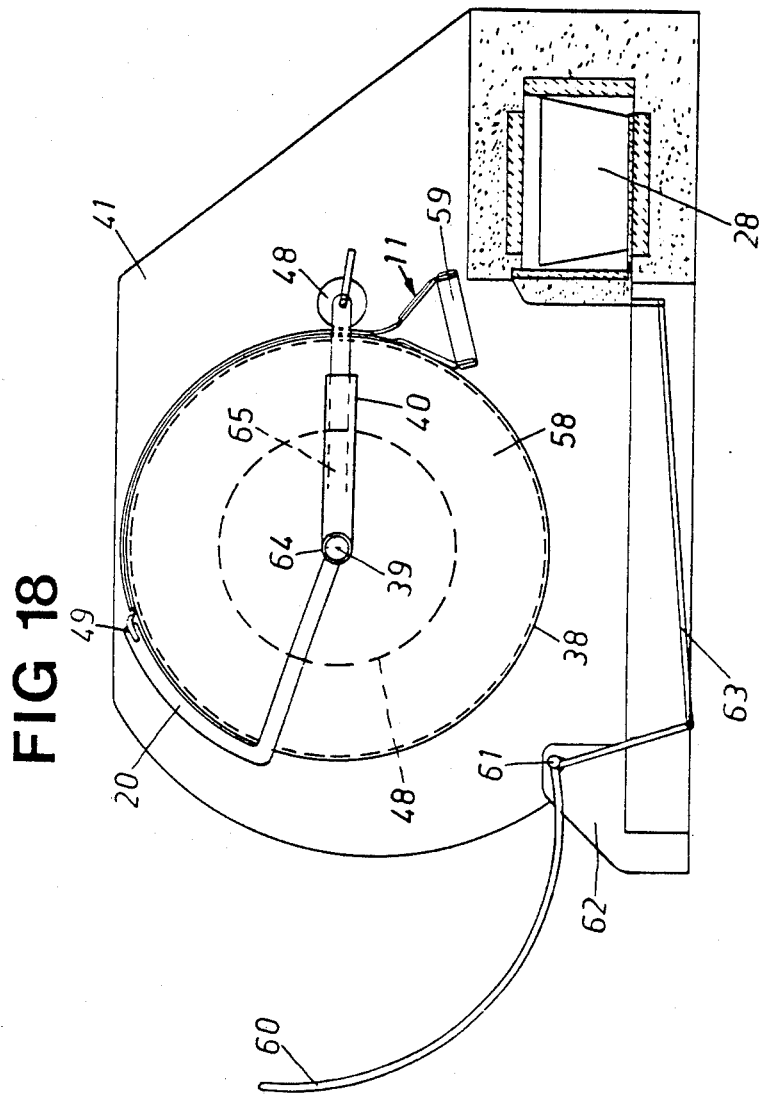

The guide 60 can be adjusted for light pressure on the plastic bag during fermentation whereby an effective distribution of the heat from the fermentation is achieved, as shown in FIG. 15. The guide 60 is appropriately made of a heat conduction material, for example, aluminum. During the fermentation itself the guide 60 can only weakly press the plastic bag and must give way when the dough expands. When the dough preparation is concluded the drum 58 is rotated clockwise enough that the cone-shaped opening with the holding means 11 is placed above the baking pan 28, as shown in FIG. 16. The kneading means 20 also partakes of this motion so that the plastic bag 12 is turned upside down. In this position the pressing roll 48 is activated, nothing it has left the guide 60 and is biased by the spring 65 in the direction of the rolling board 38 of the drum 58, as shown in FIG. 16. The pressing roll 48 is moved over the whole length of the plastic bag up to the annular holding means 11 pressing the dough out of the plastic bag opening and into the baking pan 28, as seen in FIG. 17. Before the baking takes place a further fermentation can occur. Finally the drive mechanism 62 moves the baking pan 28 into the heat treating station 14 where it is possible for a final fermentation to take place and the baking carried out, see FIG. 18. When the baking procedure is concluded it is possible that the baking pan 28 is again taken out of the baking oven so that the bread can cool outside the oven.

Figure 19:
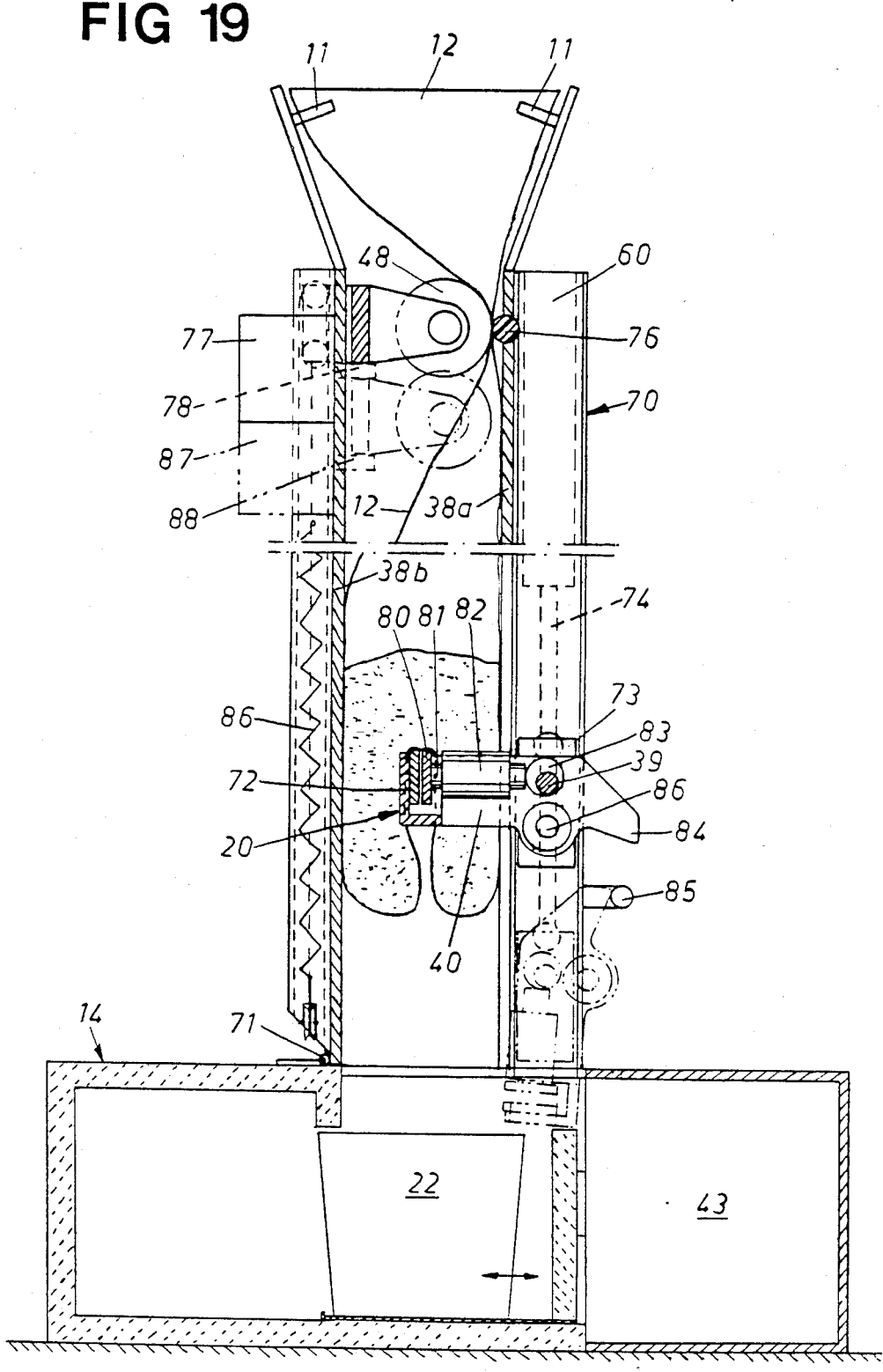
FIGS. 19-20 is a side view and a front view respectively of a further embodiment of the apparatus according to the invention.
Figure 20:
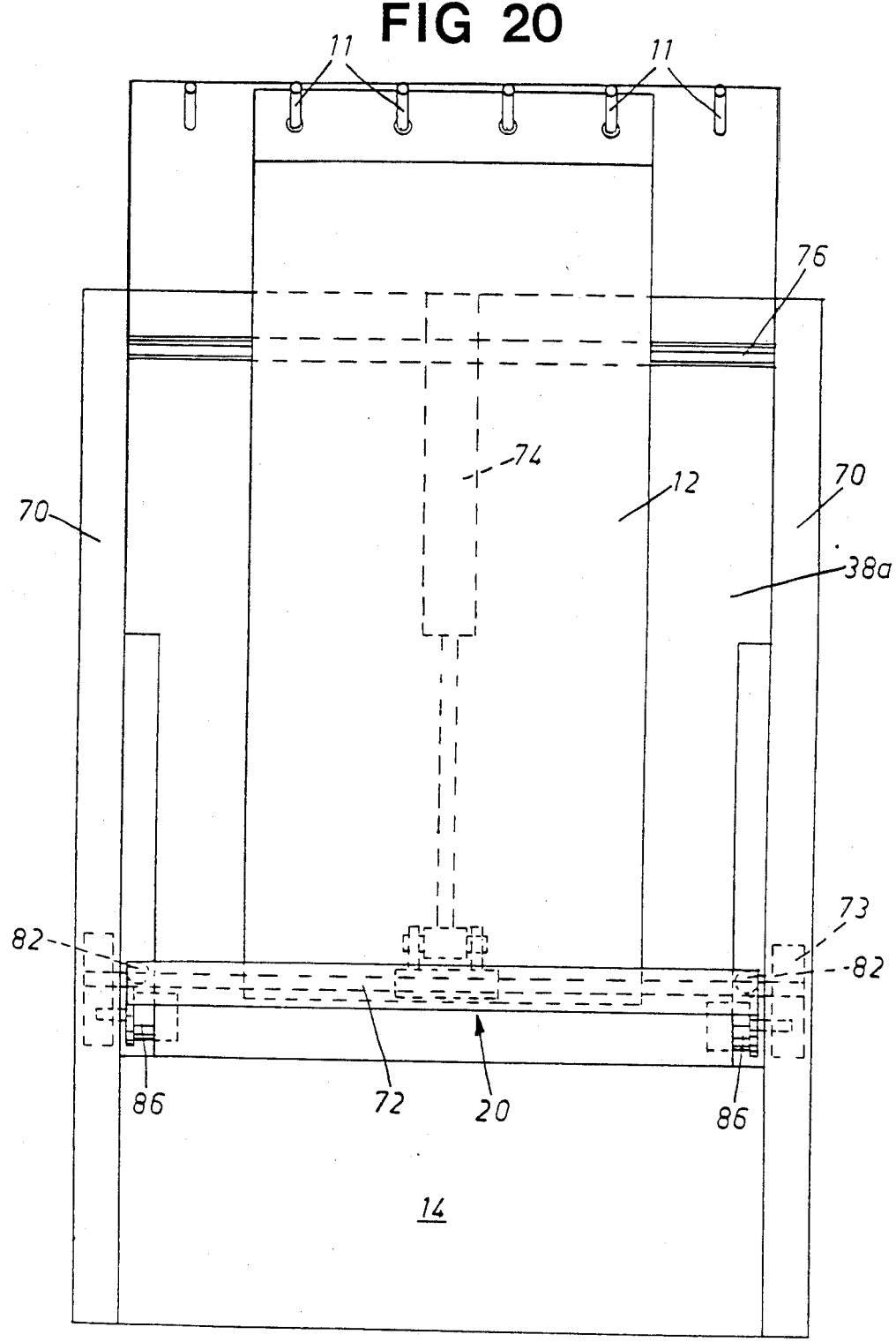

FIGS. 19 and 20

In the embodiment shown in FIGS. 19 and 20 the dough preparation station 13 is provided with two rolling board paths 38a and 38b, one of which 38a is fixed to a vertical stand 70 and the other path 38b is pivotally mounted about a hinge 71 located at the lower part of the stand. At the upper ends of the two rolling boards paths 38a, 38b holding pieces 11 in the form of pins on which the flexible vessel 12 can be hung in such a way, that its opening is kept in an open position. For working the contents of the flexible vessel 12 a kneading means 20 comprising a holding means extending over the entire width of the board path 38a, the holding means seals and holds the lower open end of the bag 12. The holding means comprises a fixed rail 72 which at both ends is connected to an arm 40, which by means of a sliding block 73 or the like is guided in a vertical guide 60 in the stand 70. The kneading means 20, which is designed as a holding means, is movable up and down by means of a linear motor 74. A movable rail 80 is also attached to the arm 40, the rail being supported by pivots 81 mounted in bushing 82 attached to the respective arm 40. The end of the pivot 81 remote from the rail 80 cooperates with an eccentric plate 83, which is fixed on the rotation axle 39 of the arm 40, so that the two rails 72,80 of the holding means are pressed together when the arm 40 takes the position shown in FIG. 19, while the rails 72, 80 are separated when the arm 40 has been pivoted 90° downwards. The end of the arm 40 remote from the holding means is provided with an extension 84 intended to cooperate with a stop 85 at the lower part of the stand 70. The arm 40 is further provided with a blocking means 86 in the form of an electromagnet for fixing the arm 40 to the sliding block 73 in the position shown in FIG. 19.

On the inside of the second rolling board path 38b a pressing roll 48 is located and is displaceable along a second guide means 75, the pressing roll 48 at its upper position shown in FIG. 19 with continuos lines cooperates with a sealing strip 76 arranged on the rolling board path 38a to seal the flexible vessel 12 (plastic bag). In this upper position of the pressing roll 48 a tight seal is provided so that the liquid to form dough can be poured in the upper portion of the plastic bag. The pressing roll 48 is actuated by a draw spring 86 striving to displace the pressing roll downwards towards the baking oven 14. The pressing roll 48 is kept in its uppermost position by a locking pin 78 actuated by an electromagnet 77, and in a second somewhat lower position by means of a second locking pin 88 actuated by a second electromagnet 87. In this second position the sealing is ceased, so that the dough liquid can run down into the lower portion of the vessel 12, where the other ingredients are.

The mixing of the ingredients and the kneading of the dough is carried out in a similar way as in the above described embodiments by displacing the kneading means, i.e. the rail 72 up and down as is shown in FIG. 20. When the working of the dough and the fermentation is completed the kneading means 20 is pivoted to a position outside the radius of action of the pressing roll 48, i.e. to a position below the guide 60 as is shown in FIG. 19 in the dash dotted line. In order to perform this pivoting movement the linear motor 74 is activated, and arm 40 is pivoted about the axle 39 when the rear extension 84 of the arm 40 hits the stop 85.

The lower end of the bag 12 is released by admitting the pivot shafts 81 of the movable rail 80 to perform an axial movement towards the rotation axle 39 in cooperation with the eccentric plate 83 as shown with dash dotted lines in FIG. 19.

The dough mass is pressed out of the bag 12 by activating the electromagnet 87 by which the locking pin 88 is retracted from the path of the pressing roll 48. The pressing roll is moved downwardly by the tension of the spring.

The baking apparatus in the same way as in the other embodiments, contains a heat treating station 14 in the form of a baking oven and a driving means 43 for displacing the baking pan from the catching position just below the plastic bag 12 to a position in the baking oven 12.

Figure 21:
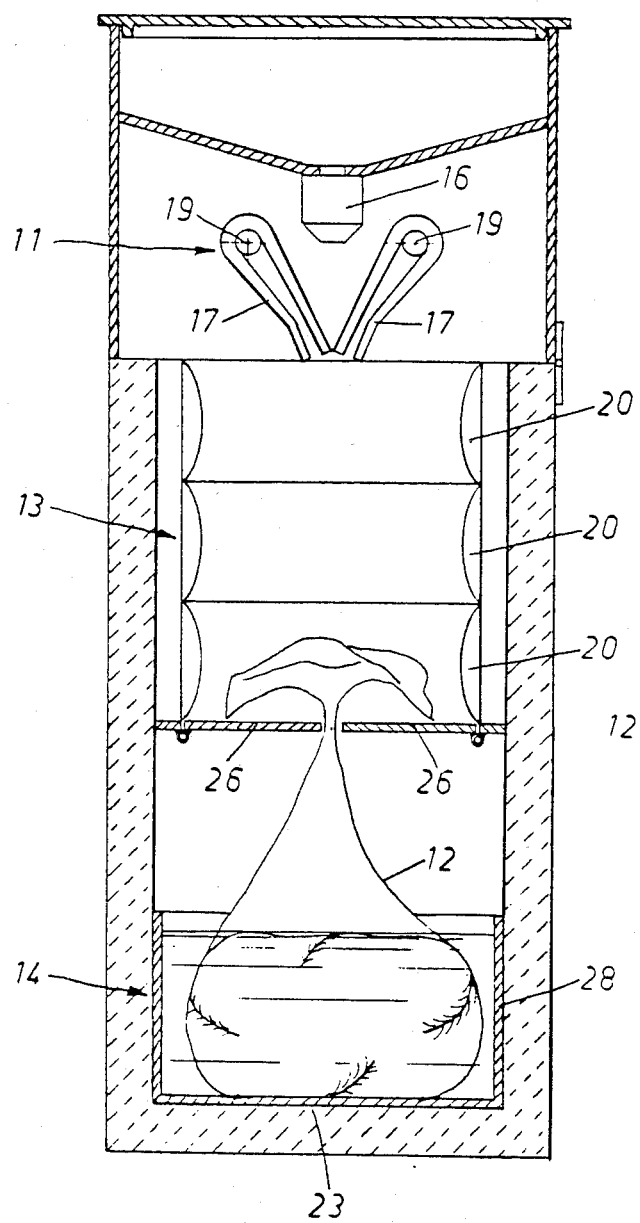
FIG. 21 shows schematically a section through a further embodiment of an apparatus according to the invention, in which also the heat treatment of the dough is performed in the vessel.

Depending on what kind of food product is to be produced in the baking apparatus the heat treating station is adjusted also in accordance with those requirements. If the dough, for example, is to be boiled in water or fried in oil the baking pan is exchanged for an appropriate cooking vessel. For certain food products cooling in a water bath is an important condition for a successful result and in such cases it can be appropriate to keep the dough in the bag during the heat treatment as is shown in FIG. 21.

In a simplified embodiment the heat treating station is separated from the dough preparation apparatus 13 and in such cases the baking oven or the like present in every household can be used for the heat treatment. According to a further simplified embodiment the driving means 42 and 74 resp. of the dough preparation apparatus can be replaced by manually operated means. As an example the linear motor 74 in FIG. 19 and 20 can be replaced by a screw provided with right-hand and left-hand threads, and which by means of a crank drives a reciprocating nut, to which the kneading means 72 is attached. Also the pressing roll 48 is in this embodiment manually displaceable for squeezing out the dough from the bag.

The invention is not limited to the embodiments described and shown but a plurality of modifications are possible within the scope of the claims.

I claim:

1. An apparatus for automatically making food products in piece form from dough-like substances comprising a dough preparation station containing holding means adapted to be affixed to the opening of a flexible sealable bag containing the necessary substantially dry ingredients for the dough-like substance; liquid means for introducing a predetermined amount of liquid into the bag; kneading means for mechanically working the liquid and dry ingredients in said bag; and transfer means for transferring the kneaded dough-like substance to a heat treating station which contains a receptacle and heating means whereby the kneaded dough-like substance is treated; the operation of the aforementioned elements being all predetermined with program means and therefore the apparatus will make the food product and such product will be in the fresh prepared state at the desired time.

2. The apparatus as claimed in claim 1, wherein said holding means is provided with gripping pieces which are adapted to grip at least one opening of the flexible bag and the holding means are movable along with said gripping pieces so as to selectively open and close the bag.

3. The apparatus as claimed in claim 1, wherein said liquid means is at least one further flexible bag adapted to contain the predetermined amount of liquid, said at least one further flexible bag being within said flexible bag and capable of being broken by the kneading means so as to mix the liquid with the dry ingredients to form dough.

4. The apparatus as claimed in claim 1, wherein said kneading means take the form of a plurality of devices on either side of the flexible bag for mechanically working the contents of said bag.

5. The apparatus as claimed in claim 4, wherein said plurality of devices are fluid expandible and contractible annuluses in stacked relationship made of elastomeric material wherein the annuluses are selectively expanded by the introduction of fluid thereby constricting the flexible bag within the annuluses and carrying out the kneading action.

6. The apparatus as claimed in claim 4, wherein said plurality of devices are parallel rollers mounted so as to be able to move along guides to traverse the length of said flexible bag and also mounted so as to be movable towards and away from the parallel roller on the other side of said bag.

7. The apparatus as claimed in claim 1 wherein said transfer means includes a cutting means to cut the bottom of said flexible bag after the dough has been properly kneaded and said transfer means also including removable supports for holding said dough in the dough preparation station and when said supports are removed the dough is released and is transferred to the heat treating station.

8. The apparatus as claimed in claim 1 wherein said kneading means includes at least one arm rotatable about an axis to define a curvilinear path and a pressing roll attached to the end defining said curvilinear path, a further roller spaced from and attached to the pressing roll and adapted to hold the end of the bag opposite the opening; the dough preparation station further having a curvilinear rolling board having substantially the same radius of curvature as that defined by said at least one arm, the flexible bag adapted to lay on the rolling board attached at the upper end by the holding means, pressed against the rolling board by the pressing roller, and attached at its lower end to said further roller so that as said at least one arm arcuately moves back and forth along the rolling board the pressing roll keeps the flexible bag closed and the further roller carries out the kneading action.

9. The apparatus as claimed in claim 8, wherein said further roller contains cutting means which are activated when said at least one arm arcuately moves down the rolling board to a predetermined point thereby cutting the end of said flexible bag attached to said further roller allowing the dough to be pressed out of said flexible bag by the rolling action of the pressing roller.

10. The apparatus as claimed in claim 8, wherein the radius of curvature of said rolling board increases at the upper end toward the holding means whereby the pressing roll exerts more pressure against the flexible bag and rolling board during its arcuate path upwards thereby effectively sealing the flexible bag.

11. The apparatus as claimed in claim 1, wherein said kneading means includes at least one arm rotatable about an axis defining a cylinder and attached to the end of said flexible bag opposite the holding means, a pressing roll mounted on at least one second arm also rotatable about said axis; the dough preparation station having a drum-shaped rolling board co-axial with said axis and rotatable thereabout, whereby the said at least one arm arcuately rotates about the axis to knead the dough.

12. The apparatus as claimed in claim 11, wherein said at least one second arm is spring biased towards the axis and after the kneading is complete the rolling board along with the flexible bag is rotated and the pressing roll moves from the end of the flexible bag opposite the holding means towards the holding means along the rolling board squeezing the dough out of the flexible bag.

13. The apparatus as claimed in claim 11, wherein said dough preparation station contains an arcuate flap having essentially the same radius or curvature as the drumshaped rolling board and pivotable towards and away from the rolling board surface, the arcuate flap being made of heat conducting material so that during a fermentation period while the dough is being kneaded the arcuate flap can be brought into contact with the outer surface of the flexible bag to effectively distribute the heat of fermentation.

14. The apparatus as claimed in claim 1, wherein said kneading means includes closing means attached to the end of the flexible bag opposite the holding means, said closing means being mounted on an arm; and drive means connected to said arm for reciprocating said arm and closing means to effect the kneading of said dough-like substance.

15. The apparatus as claimed in claim 14, wherein said arm has an extension on it which coacts with a stop to pivot said arm when said drive means moves said kneading means to an extended position.

16. The apparatus as claimed in claim 15 wherein said closing means includes a fixed rail and a moveable rail adapted to close the flexible bag which is placed between them, and an actuating means for moving said moveable rail towards and away from said fixed rail; wherein said actuating means moves said moveable rail when the arm extension coacts with the stop thereby releasing the flexible bag while the arm pivots out of the area of the flexible bag.

17. The apparatus as claimed in claim 16 wherein said transfer means is a pressing roll which traverses the length of the flexible bag and squeezes the so prepared dough from the released flexible bag.

* * * * *